United States Patent
Liang et al.

(10) Patent No.: US 11,150,518 B2
(45) Date of Patent: Oct. 19, 2021

(54) LIQUID CRYSTAL DISPLAY DEVICE

(71) Applicant: Shijiazhuang Chengzhi Yonghua Display Material Co., Ltd., Shijiazhuang (CN)

(72) Inventors: Zhian Liang, Shijiazhuang (CN); Jiaming Li, Shijiazhuang (CN); Sumin Kang, Shijiazhuang (CN); Xuan Zhang, Shijiazhuang (CN); Dongmei Wang, Shijiazhuang (CN)

(73) Assignee: SHIJIAZHUANG CHENGZHI YONGHUA DISPLAY MATERIAL CO., LTD., Shijiazhuang (CN)

( * ) Notice: Subject to any disclaimer, the term of this patent is extended or adjusted under 35 U.S.C. 154(b) by 197 days.

(21) Appl. No.: 16/240,077

(22) Filed: Jan. 4, 2019

(65) Prior Publication Data
US 2020/0073180 A1  Mar. 5, 2020

(30) Foreign Application Priority Data
Aug. 31, 2018 (CN) .......................... 201811010664.0

(51) Int. Cl.
*G02F 1/1337* (2006.01)
*G02F 1/1362* (2006.01)
*C09K 19/12* (2006.01)
*C09K 19/56* (2006.01)
*C09K 19/30* (2006.01)
*C09K 19/04* (2006.01)

(52) U.S. Cl.
CPC ...... *G02F 1/133723* (2013.01); *G02F 1/1362* (2013.01); *C09K 19/12* (2013.01); *C09K 19/3066* (2013.01); *C09K 19/3098* (2013.01); *C09K 19/56* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3036* (2013.01); *C09K 2323/02* (2020.08); *G02F 1/136222* (2021.01); *G02F 2202/022* (2013.01)

(58) Field of Classification Search
CPC ................ C09K 19/12; C09K 19/3066; C09K 19/3098; C09K 19/54; C09K 19/56; C09K 2019/0448; C09K 2019/122; C09K 2019/123; C09K 2019/3004; C09K 2019/3009; C09K 2019/301; C09K 2019/3016; C09K 2019/3021; C09K 2019/3027; C09K 2019/3036; C09K 2019/546; G02F 1/133703; G02F 1/133723; G02F 1/1362; G02F 2001/136222; G02F 2202/022
See application file for complete search history.

(56) References Cited

U.S. PATENT DOCUMENTS

| | | | |
|---|---|---|---|
| 2013/0083278 A1* | 4/2013 | Teraoka | C08G 73/10 349/127 |
| 2013/0265527 A1* | 10/2013 | Takeuchi | C09K 19/3066 349/86 |
| 2015/0184075 A1* | 7/2015 | Wen | C09K 19/3066 252/299.63 |
| 2015/0252265 A1* | 9/2015 | Archetti | G02F 1/1337 349/130 |

* cited by examiner

*Primary Examiner* — Sophie Hon
*Assistant Examiner* — Sow-Fun Hon
(74) *Attorney, Agent, or Firm* — Muncy, Geissler, Olds & Lowe, P.C.

(57) ABSTRACT

Provided is a liquid crystal display device comprising a first substrate, a second substrate, and a liquid crystal composition disposed between said first substrate and said second substrate, wherein a surface of said first substrate in contact with said liquid crystal composition is provided with an alignment layer, while said second substrate has no alignment layer; and said liquid crystal composition comprises a liquid crystal compound, a self-aligning agent, and a polymerizable compound represented by Formula I,

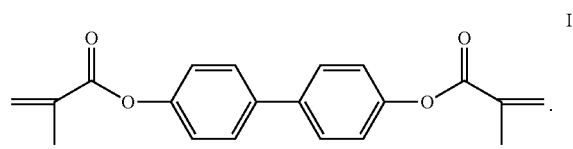

5 Claims, No Drawings

LIQUID CRYSTAL DISPLAY DEVICE

TECHNICAL FIELD

The present invention pertains to the field of liquid crystal display technologies. More specifically, the present invention relates to a liquid crystal display device.

BACKGROUND ART

With the development of display technologies, flat panel display devices such as liquid crystal displays (LCD) are widely used in various consumer electronic products, such as mobile phones, televisions, personal digital assistants, digital cameras, notebook computers and desktop computers and have become the mainstream in display devices due to the advantages of having a high image quality, power saving, a thin body, a wide application range, etc.

Generally, a liquid crystal display device comprises a colour filter (CF) substrate, a thin film transistor (TFT) substrate, a liquid crystal (LC) composition layer sandwiched between the colour filter substrate and the thin film transistor substrate, and a sealant.

At present, in a common liquid crystal display device (LCD), a CF substrate and a TFT substrate respectively have a layer of film material, and the main functions thereof are to arrange liquid crystal molecules in a certain orientation, this layer being referred to as an alignment layer. This alignment layer is mainly classified into a rubbing alignment type and a photo-alignment type. The alignment layer has the characteristics of uniformity, adhesion and stability; the alignment layer can not only align liquid crystal molecules, but also has another important function that is to serve as an insulating film between the liquid crystal molecules and the liquid crystal display device substrate, and the alignment layer is capable of holding a voltage applied to the substrate within one frame of time, thereby preventing impurities such as ions in the substrate from diffusing into the liquid crystal molecules, thereby maintaining the purity of the liquid crystal molecules. However, the alignment layer also has certain disadvantages. Firstly, an alignment layer of the rubbing alignment type are prone to problems of dust particles, electrostatic residue, brush marks, etc., during the process of displaying of a liquid crystal display device, thereby lowering the yield of the fabrication of the liquid crystal display device, whereas an alignment layer of the photo-alignment type can avoid the above-mentioned problems; however, since the properties of the material of the alignment layer of the photo-alignment type are limited, the heat resistance and ageing resistance thereof are poorer, and the ability to anchor liquid crystal molecules is also weaker, and thus the displaying effect of the liquid crystal display device is affected; secondly, the process for forming a film on TFT-LCD, for an alignment layer, is also complicated, resulting in an increase in the cost of producing the liquid crystal display device.

If the alignment layer is completely removed from the liquid crystal display device, the liquid crystal molecules will not be vertically aligned. At present, liquid crystal molecules are vertically aligned by adding a self-aligning agent to the liquid crystal layer, this relying on the characteristics of the self-aligning agent adsorbed on the surface of the substrate. However, if the alignment layer is completely omitted, the liquid crystal display device tends to have problems such as non-uniform display and poor alignment of liquid crystal molecules, and the afterimage problem of the liquid crystal display device will also be serious.

In a liquid crystal display device of PSVA (Polymer Stabilized Vertically Aligned) or SAVA (Vertical Self-Aligned) display mode, the liquid crystal layer contains a polymerizable compound as a reactive mesogen (RM), and since there is a possibility of leaving a reactive mesogen (RM) residue during the process of fabricating a liquid crystal display device, and the RM residue may causes the problem that display defects such as afterimage may occur to the liquid crystal display device, the larger the amount of the RM residue, the more serious the afterimage problem.

SUMMARY OF THE INVENTION

In order to obtain a liquid crystal display device having less afterimage and a simple preparation process, the inventors of the present application have conducted intensive studies and found that this object can be achieved by means of the liquid crystal display device of the present invention, thereby completing the present invention.

An object of the present invention is to provide a liquid crystal display device.

As an embodiment of the present invention, the liquid crystal display device comprises a first substrate, a second substrate, and a liquid crystal composition disposed between the first substrate and the second substrate, wherein a surface of said first substrate in contact with the liquid crystal composition is provided with an alignment layer, while said second substrate has no alignment layer; and the liquid crystal composition comprises a liquid crystal compound, a self-aligning agent, and a polymerizable compound represented by Formula I.

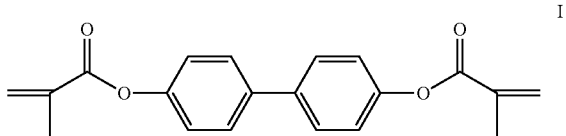 [SMILES: C=C(C)C(=O)Oc1ccc(-c2ccc(OC(=O)C(=C)C)cc2)cc1]

The liquid crystal display device provided by the present invention has the characteristics of a wider nematic phase temperature range, a suitable or higher birefringence anisotropy Δn, and a high charge retention ratio; and by means of the use of a polymerizable compound represented by formula I as a reactive mesogen (RM) in combination with a liquid crystal compound and a self-aligning agent, the conversion ratio of the reactive mesogen (RM) and the residual amount of the reactive mesogen (RM) during the process of fabricating the liquid crystal display device are increased, thereby effectively shortening the process of preparing the liquid crystal display device, improving the production efficiency and reducing the extent of the afterimage display defect occurred to the liquid crystal display device.

DETAILED DESCRIPTION OF EMBODIMENTS

As an embodiment of the present invention, the liquid crystal display device comprises a first substrate, a second substrate, and a liquid crystal composition disposed between the first substrate and the second substrate, wherein a surface of the first substrate in contact with the liquid crystal composition is provided with an alignment layer, while the second substrate has no alignment layer; and the liquid crystal composition comprises a liquid crystal compound, a self-aligning agent, and a polymerizable compound represented by Formula I.

I

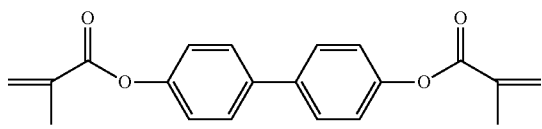

During the process of fabricating the liquid crystal display device, the polymerizable compound represented by Formula I acts as a reactive mesogen (RM) to photopolymerize with a self-aligning agent by means of ultraviolet irradiation to form a polymer film. By means of the intermolecular physical adsorption between the self-aligning agent and the second substrate, one side of the formed polymer film is bonded to the second substrate, and the other side thereof is in contact with the liquid crystal composition; furthermore, the polymer film functions to vertically align the liquid crystal molecules. There may also be a polymer film on the side of the alignment layer of the first substrate in contact with the liquid crystal composition; similarly, by means of the intermolecular physical adsorption between molecules, one side of the formed polymer film is bonded to the first substrate, and the other side thereof is in contact with the liquid crystal composition, wherein the polymer film can effectively prevent the alignment layer from the occurrence of the problem of a reduced liquid crystal display device yield caused by dust particles, electrostatic residues, etc., generated during the process of the displaying of the liquid crystal display device.

The liquid crystal display device has the characteristics of a wider nematic phase temperature range, a suitable or higher birefringence anisotropy Δn, and a high charge retention ratio; and by means of the use of a polymerizable compound represented by formula I as a reactive mesogen (RM) in combination with a liquid crystal composition and a self-aligning agent, the conversion ratio of the reactive mesogen (RM) and the residual amount of the reactive mesogen (RM) during the process of fabricating the liquid crystal display device are increased, thereby effectively shortening the process of preparing the liquid crystal display device, improving the production efficiency and reducing the extent of the afterimage display defect occurred to the liquid crystal display device.

Preferably, the content in percentage of the compound represented by formula I mentioned previously is 0.01-1%, preferably 0.03-0.5%, of the total mass of the liquid crystal composition. From the point of view of reducing the afterimage display defect of the liquid crystal display device, the content of the compound represented by formula I mentioned previously is preferably not more than 1%, and further preferably not more than 0.5%. In addition, from the point of view of polymerizing with the self-aligning agent to form a polymer film so as to align the liquid crystal molecules and preventing the alignment layer from reduction in the liquid crystal display device yield caused by dust particles, electrostatic residues, etc., generated during the process of the displaying of the liquid crystal display device, the content of the compound represented by formula I mentioned previously is preferably not less than 0.01%, further preferably not less than 0.03%.

In some embodiments of the liquid crystal display device of the present invention, optionally, the above-mentioned first substrate is a thin film transistor substrate, and the above-mentioned second substrate is the colour filter substrate; or the above-mentioned first substrate is a colour filter substrate, and the above-mentioned second substrate is a thin film transistor film. Preferably, the above-mentioned first substrate is a thin film transistor substrate, and the above-mentioned second substrate is a colour filter substrate;

In some embodiments of the liquid crystal display device of the present invention, the above-mentioned alignment layer has a thickness of 30 nm to 120 nm, preferably 40 nm to 60 nm, and the alignment layer is a polyimide film layer.

In some embodiments of the liquid crystal display device of the present invention, the above-mentioned self-aligning agent has at least two anchoring functional groups and 1-3 polymerizable functional groups.

The anchoring functional groups in the self-aligning agent have the function of adsorption and fixation to the substrate, and may be selected from optionally hydroxyl, ester groups, and carbonyl, preferably hydroxyl, and there are at least two such groups. The polymerizable functional groups are functional groups capable of polymerizing with the compound represented by formula I, and are preferably methacrylate groups, acrylate groups, vinyl or ethylene oxide groups, further preferably methacrylate groups.

In some embodiments of the liquid crystal display device of the present invention, the above-mentioned self-aligning agent is selected from the group consisting of compounds represented by formulas II1 to II42.

II1

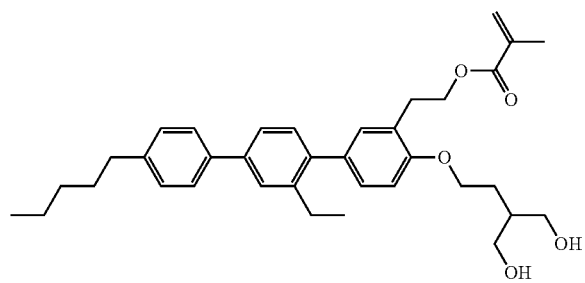

II2

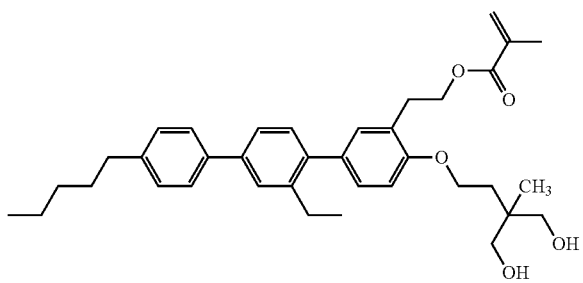

-continued
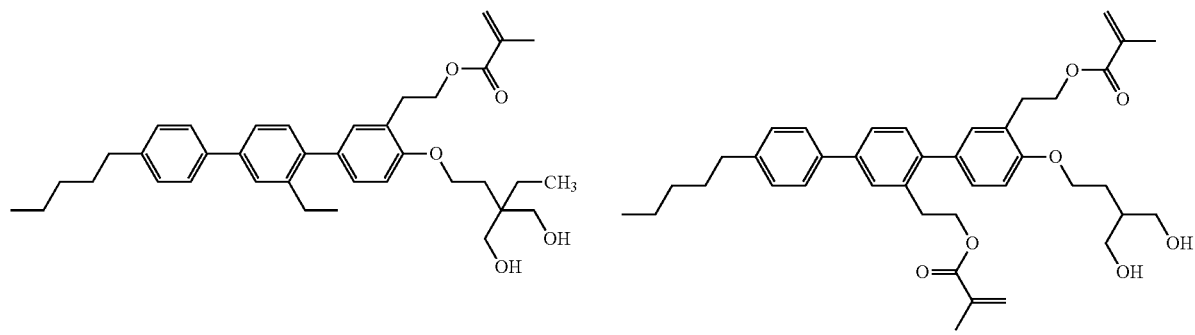
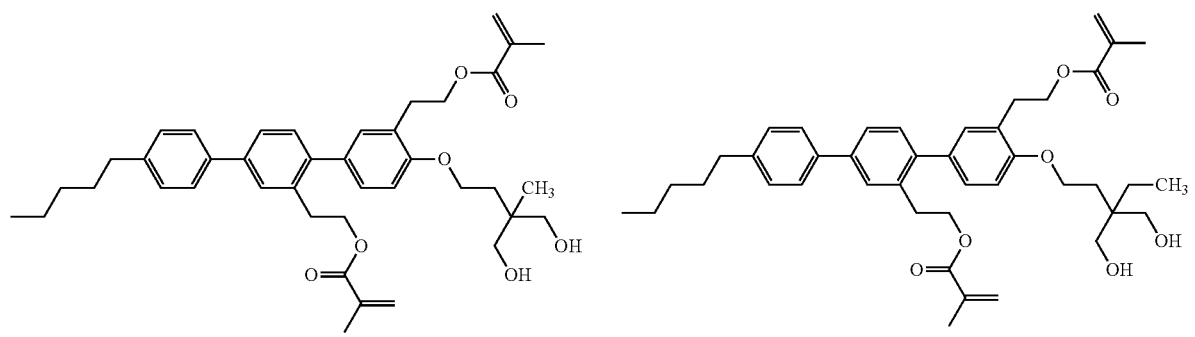
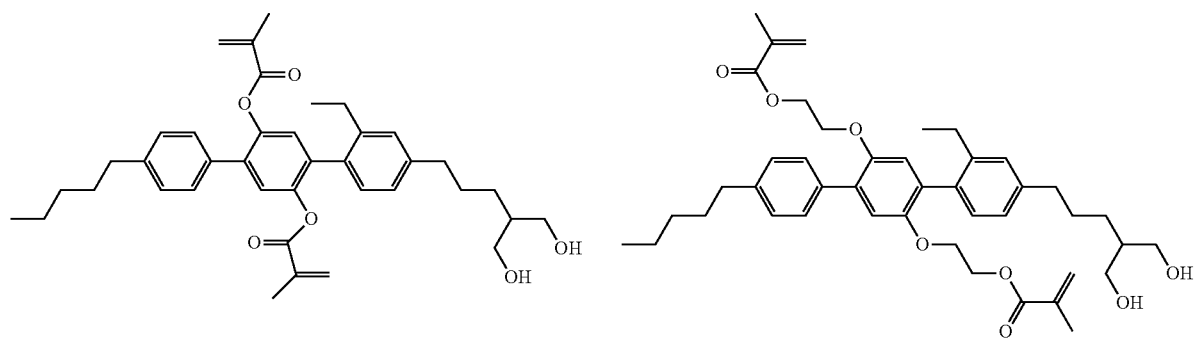
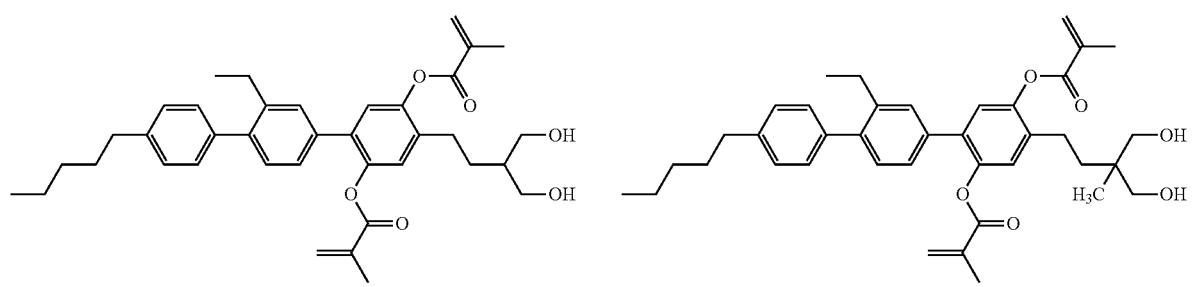

-continued
II11
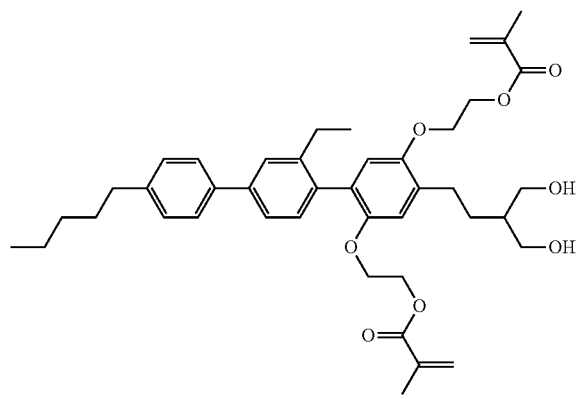
II12
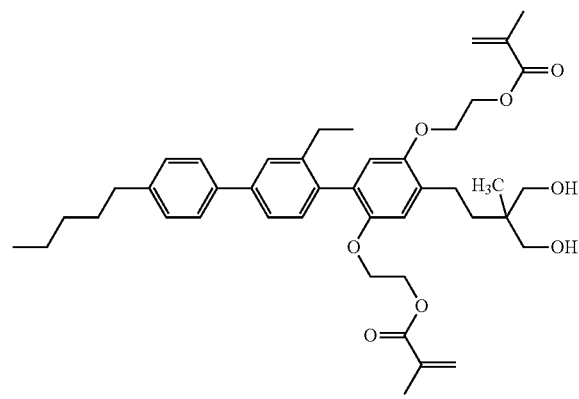
II13
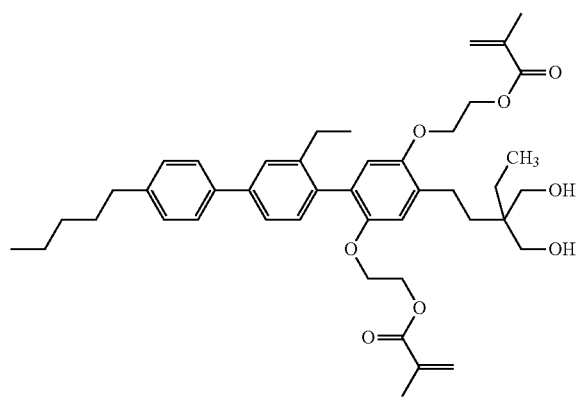
II14
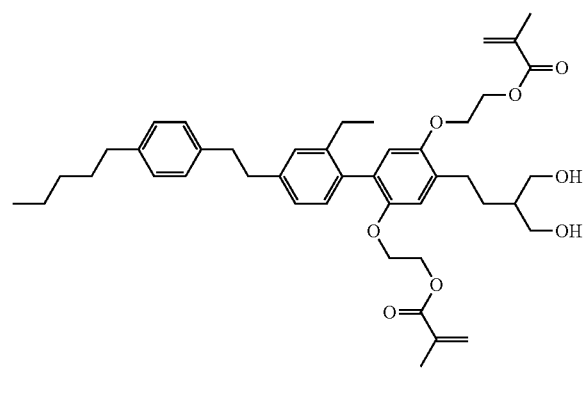
II15
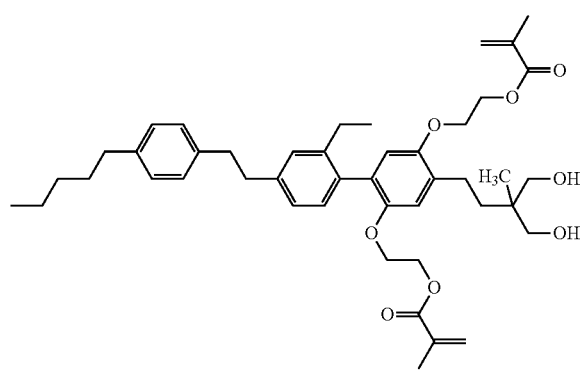
II16
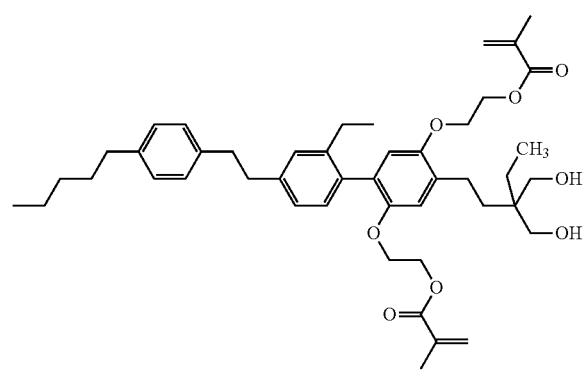
II17
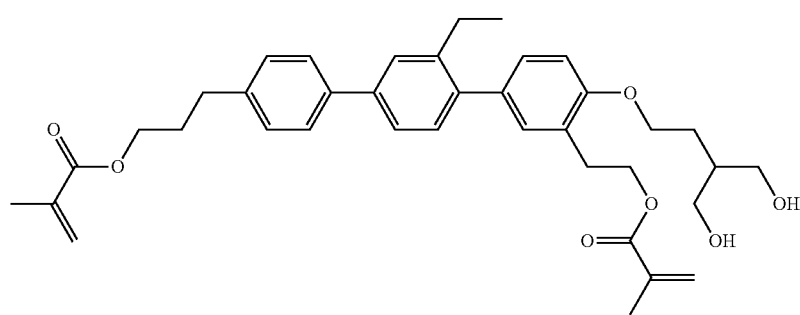

-continued
II18
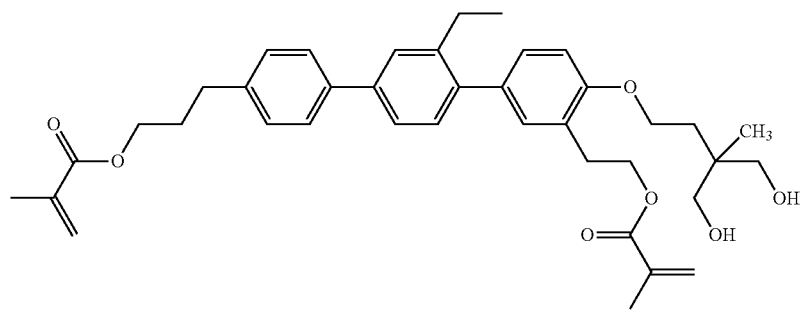
II19
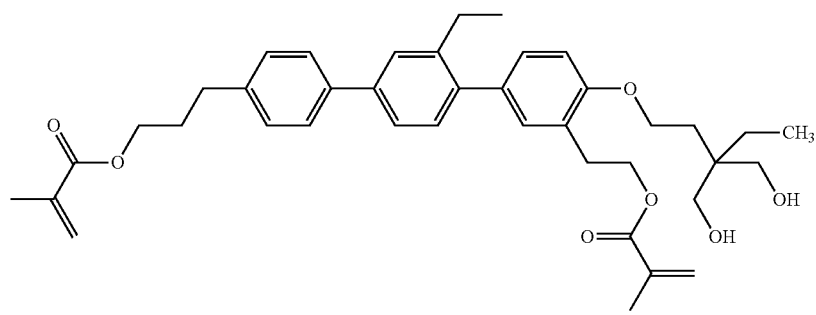
II20
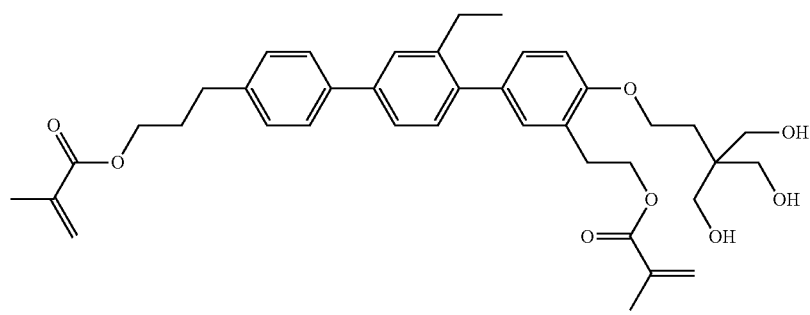
II21
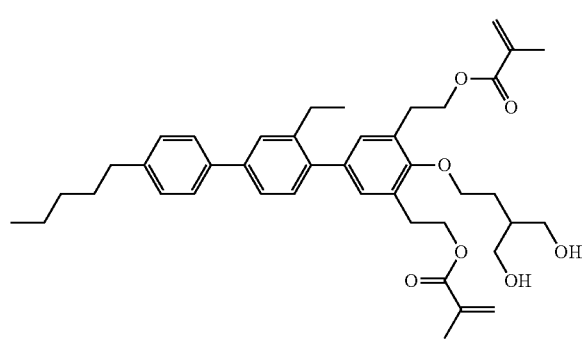
II22
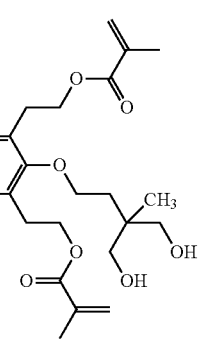
II23
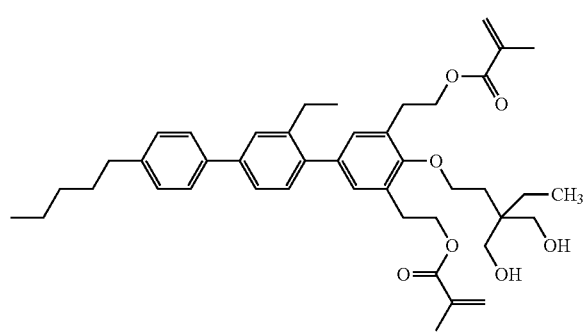
II24
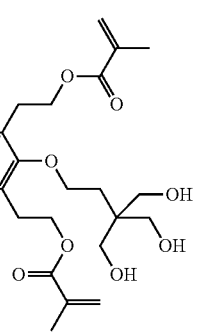

-continued
II25
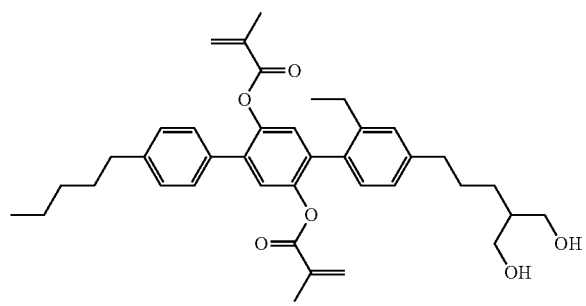
II26
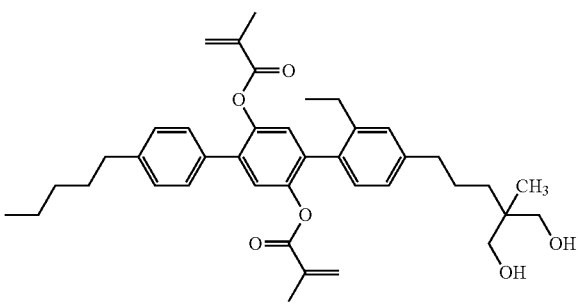
II27
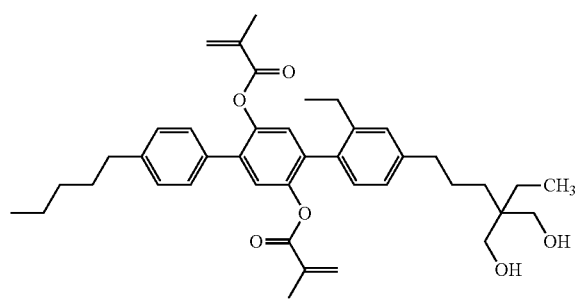
II28
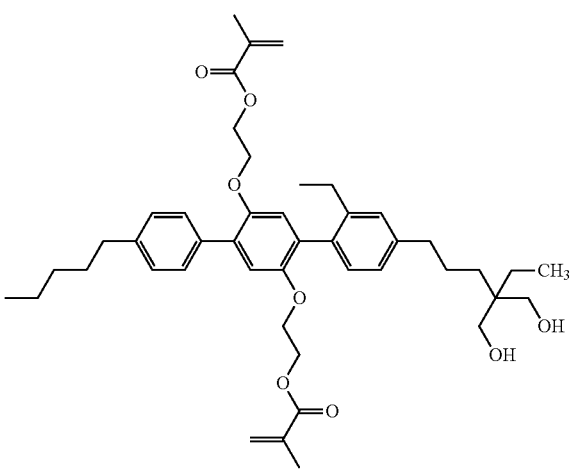
II29
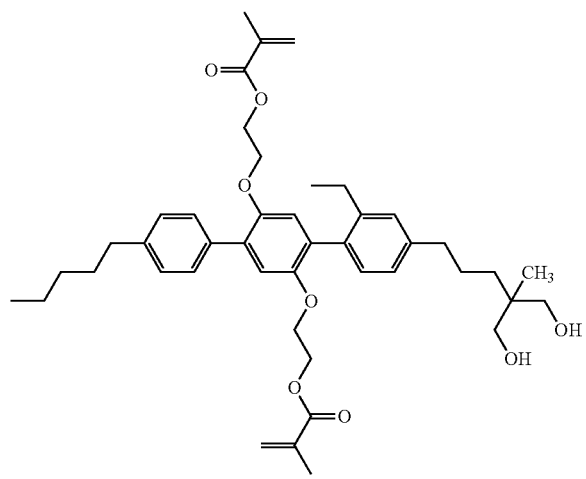
II30
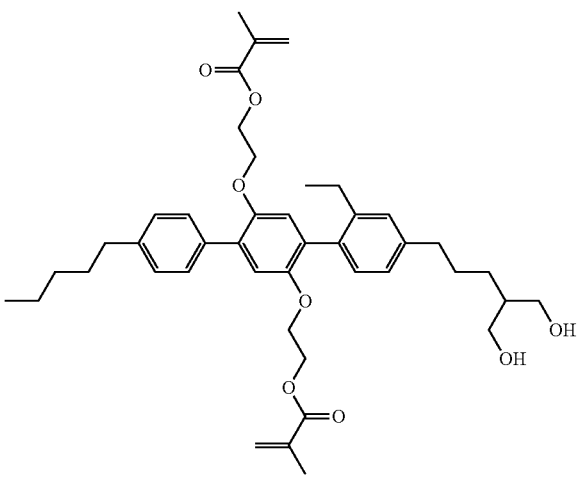
II31
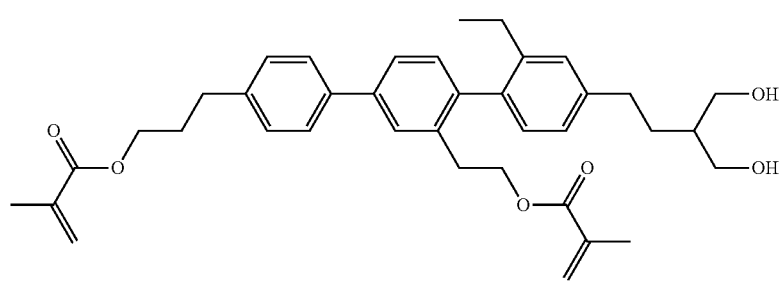

-continued
II32
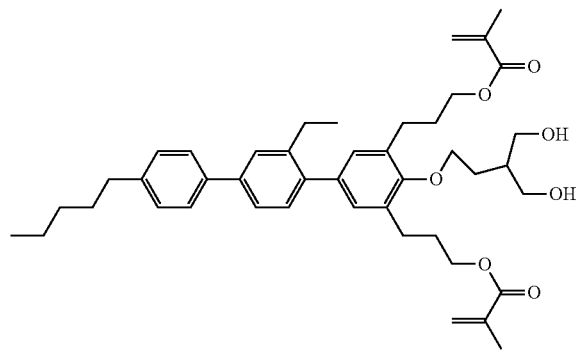
II33
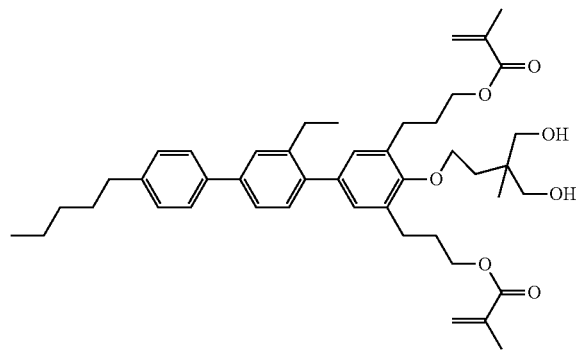
II34
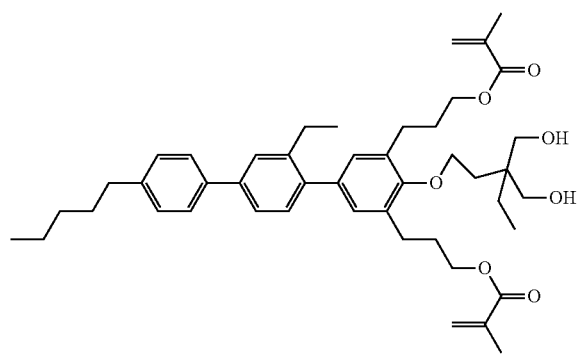
II35
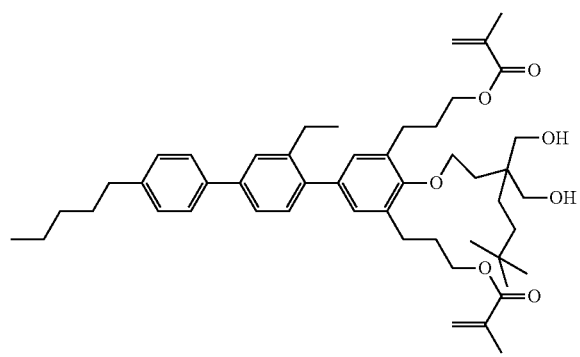
II36
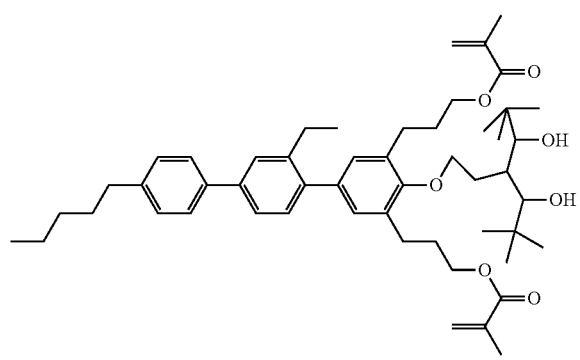
II37
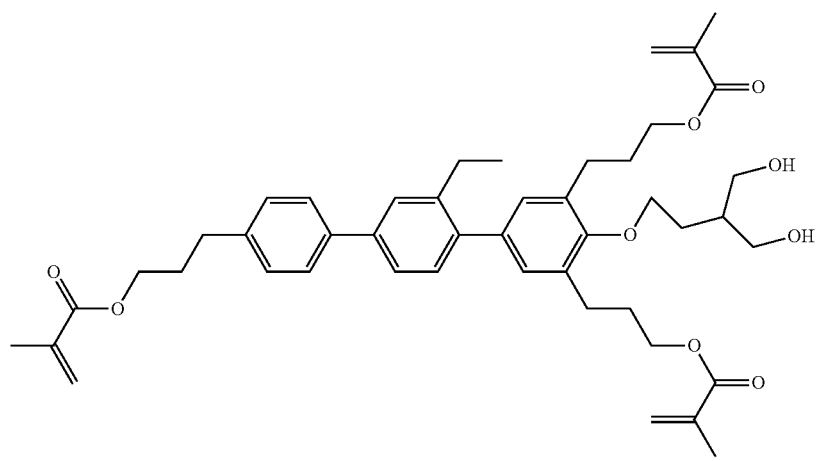

-continued
II38
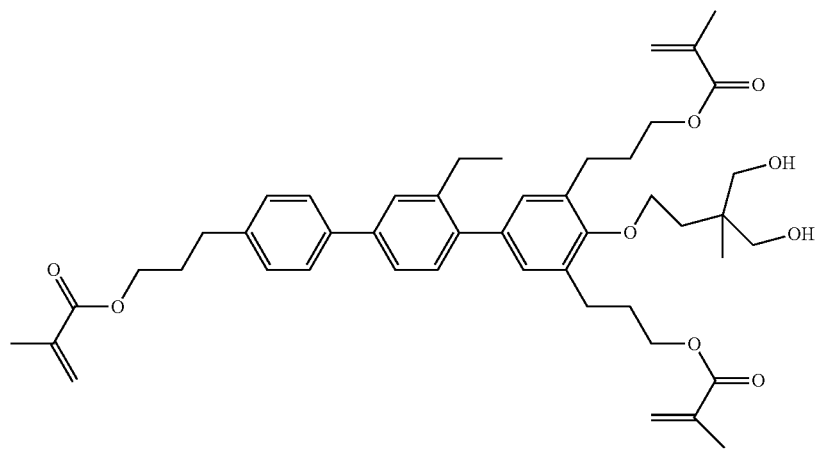
II39
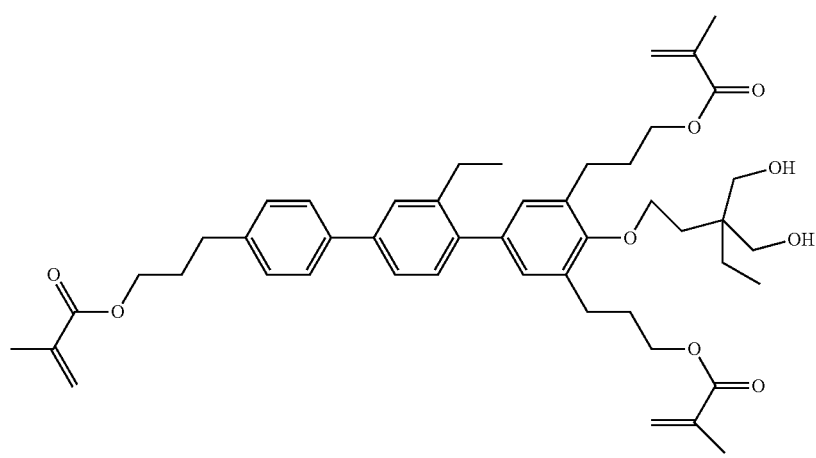
II40
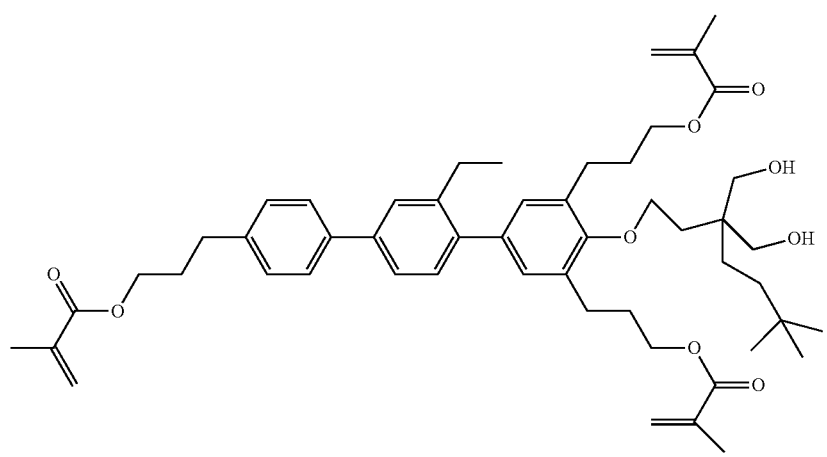

-continued

II41

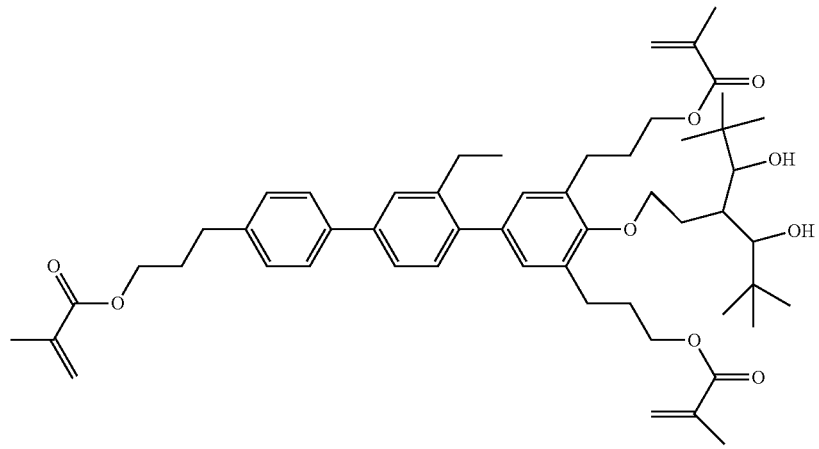

II42

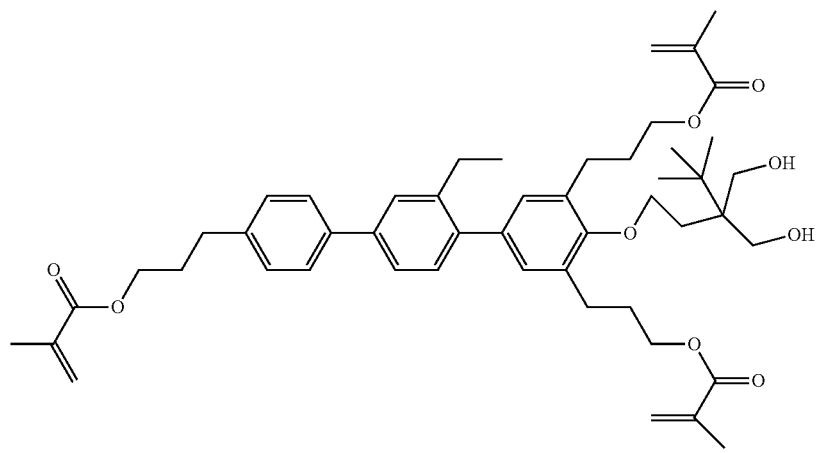

Preferably, the content in percentage of the compound represented by formula II mentioned previously is 0.1-3%, preferably 0.5-1.5%, of the total mass of the liquid crystal composition. This is because from the point of view of the ability to react with the polymerizable compound represented by formula I to form a polymer film so as to align the liquid crystal molecules and preventing the alignment layer from reduction in the liquid crystal display device yield caused by dust particles, electrostatic residues, etc., generated during the process of the displaying of the liquid crystal display device, the content in percentage of the compound represented by formula II is preferably not less than 0.1%, further preferably not less than 0.5%, of the total mass of the liquid crystal composition. In addition, the content in percentage of the compound represented by formula II is preferably not more than 3%, further preferably not more than 1.5%, of the total mass of the liquid crystal composition.

In some embodiments of the liquid crystal display device of the present invention, the above-mentioned liquid crystal compound comprises one or more compounds represented by formula III and one or more compounds represented by formula IV:

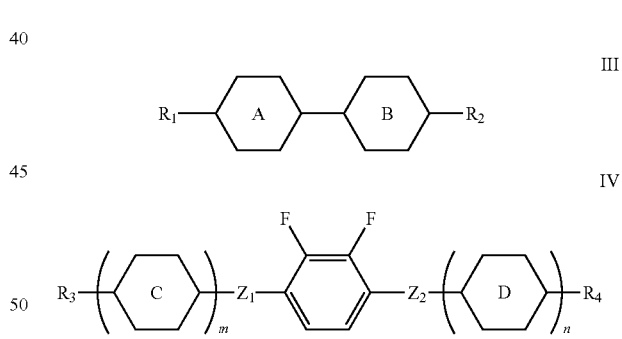

wherein in formula III, $R_1$ and $R_2$ each independently represent an alkyl group having a carbon atom number of 1-10, an alkoxy group having a carbon atom number of 1-10, an alkenyl group having a carbon atom number of 2-10, or an alkenoxy group having a carbon atom number of 3-8; and

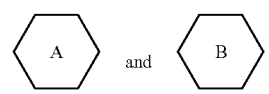

each independently represent

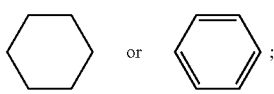 [SMILES: C1CCCCC1 ; c1ccccc1]

and in formula IV, $R_3$ and $R_4$ each independently represent an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, wherein any one or more non-connected —$CH_2$— in the groups represented by $R_3$ and $R_4$ are each independently optionally substituted with cyclopentylidene, cyclobutylidene or cyclopropylidene;

$Z_1$ and $Z_2$ each independently represent a single bond, —$CH_2CH_2$— or —$CH_2O$—;

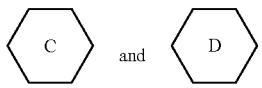

each independently represent 1,4-phenylene, 1,4-cyclohexylene, a fluoro-substituted 1,4-phenylene, or 1,4-cyclohexenylene;

m represents 1 or 2; and n represents 0, 1 or 2.

The compound represented by formula III has the characteristics of a low rotary viscosity and a good intermiscibility with other compounds. A lower rotational viscosity is more advantageous in improving the response speed of the liquid crystal composition.

The compound represented by formula IV are of negative dielectric anisotropy, and the drive voltage of the liquid crystal composition can be adjusted by means of the compound represented by formula IV.

As the group resulting from substituting one or more non-connected —$CH_2$— in the alkyl group having a carbon atom number of 1-10, as mentioned above, with cyclopropylidene, cyclobutylidene or cyclopentylidene, examples thereof include cyclopropyl, cyclobutyl, cyclopentyl, methylcyclopropylidene, ethylcyclopropylidene, propylcyclopropylidene, isopropylcyclopropylidene, n-butylcyclocyclopropylidene, isobutylcyclopropylidene, tert-butylcyclopropylidene, methylcyclobutylidene, ethylcyclobutylidene, propylcyclobutylidene, isopropylcyclobutylidene, n-butylcyclobutylidene, isobutylcyclopentylidene, tert-butylcyclobutylidene, methylcyclopentylidene, ethylcyclopentylidene, propylcyclopentylidene, isopropylcyclopentylidene, n-butylcyclopentylidene, isobutylcyclopentylidene, etc. In the groups represented by $R_3$ and $R_4$, from the point of view of the rotary viscosity, solubility, and clearing point of the liquid crystal compound, cyclopropyl, cyclobutyl or cyclopentyl is preferable.

Optionally, the above-mentioned liquid crystal composition is a liquid crystal composition with negative dielectric anisotropy.

The content in mass percentage of the compound represented by formula III is preferably 5-60%, further preferably 10-40%, of the total mass of the liquid crystal composition; and the content in mass percentage of the compound represented by formula IV is preferably 25-90%, further preferably 40-65%, of the total mass of the liquid crystal composition.

Optionally, the above-mentioned one or more compounds represented by formula III are selected from the group consisting of compounds represented by formulas III1 to III16:

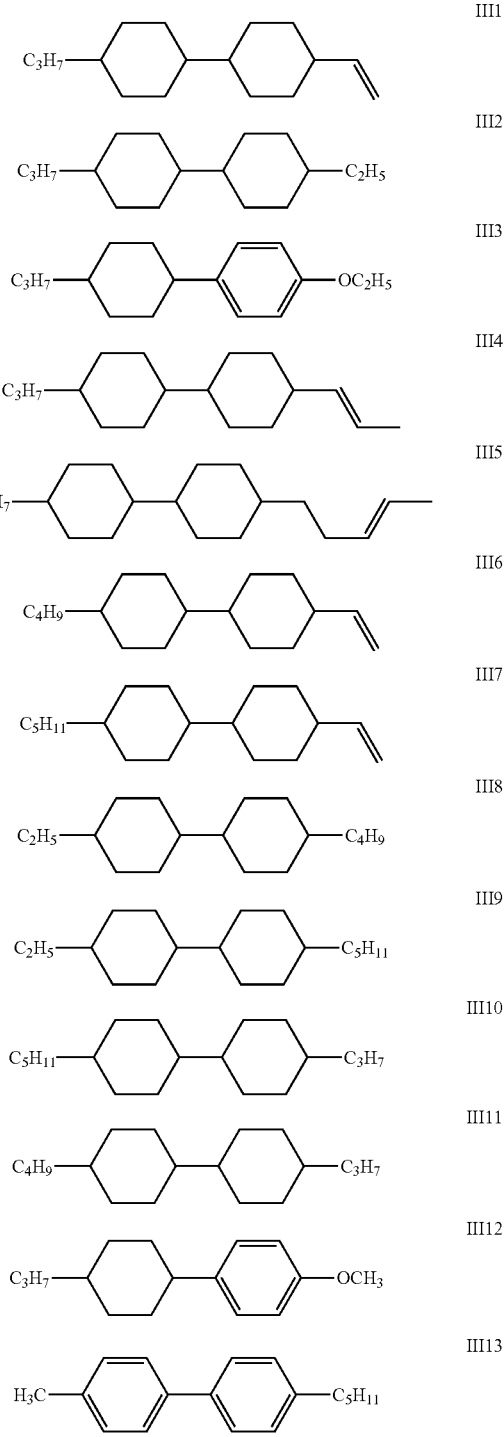

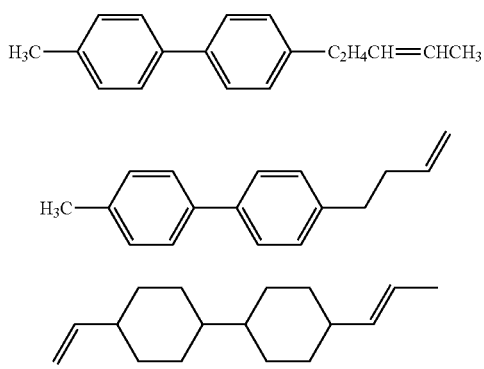

Optionally, the above-mentioned one or more compounds represented by formula IV are selected from the group consisting of compounds represented by formulas IV1 to IV14:

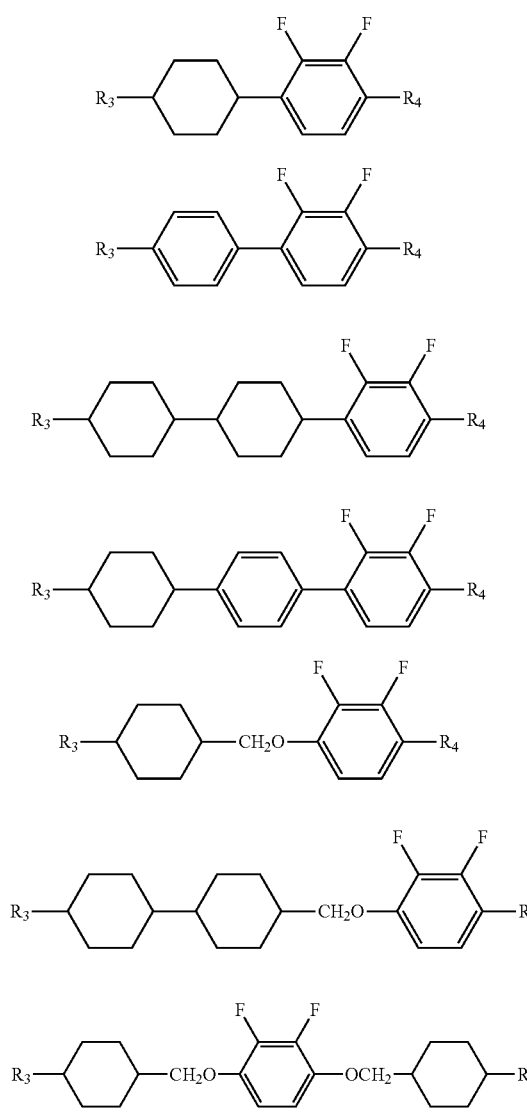

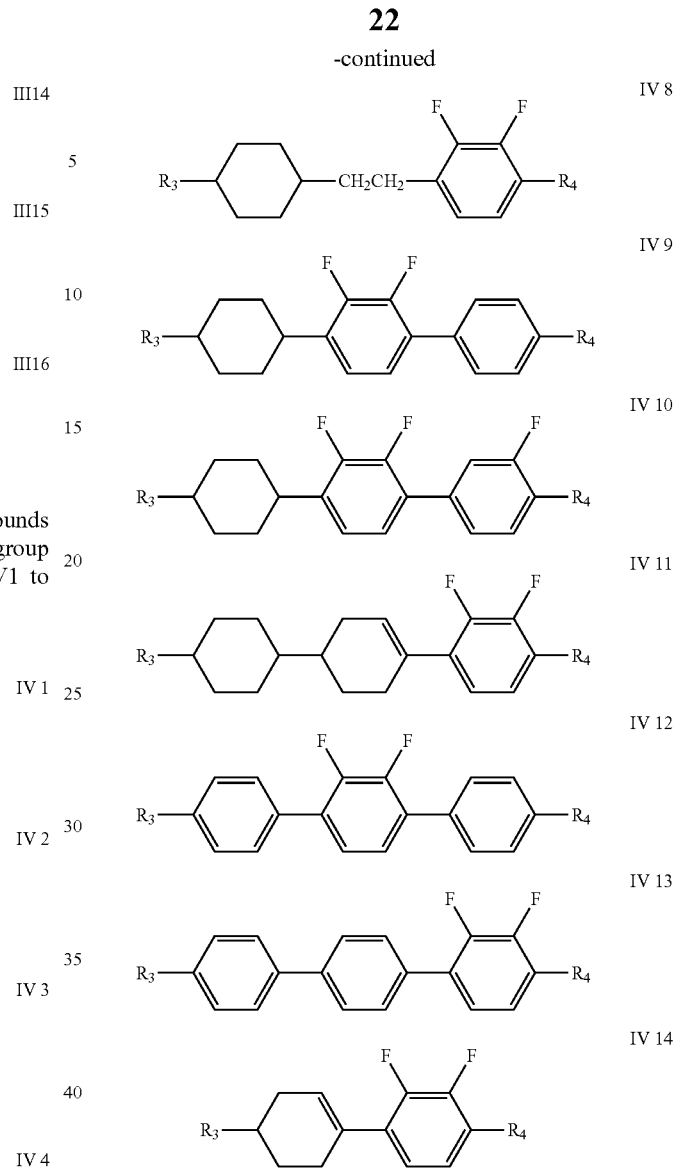

wherein $R_3$ and $R_4$ have the same meanings as the $R_3$ and $R_4$ in the compound represented by formula IV mentioned above, and each independently represent an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, wherein any one or more non-connected —CH$_2$— in the groups represented by $R_3$ and $R_4$ are optionally substituted with cyclopentylidene, cyclobutylidene or cyclopropylidene.

As another embodiment of the liquid crystal display device of the present invention, in one embodiment, optionally, the above-mentioned liquid crystal compound may comprise one or more compounds represented by formula IV:

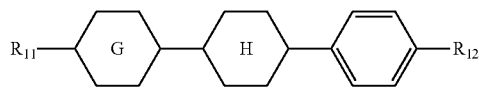

VI wherein $R_{11}$ and $R_{12}$ each independently represent an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, wherein any one or more non-connected —CH$_2$— in the groups represented by $R_{11}$ and $R_{12}$ are optionally substituted with cyclopentylidene, cyclobutylidene or cyclopropylidene;

and

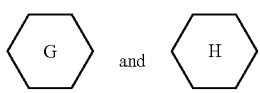

each independently represent

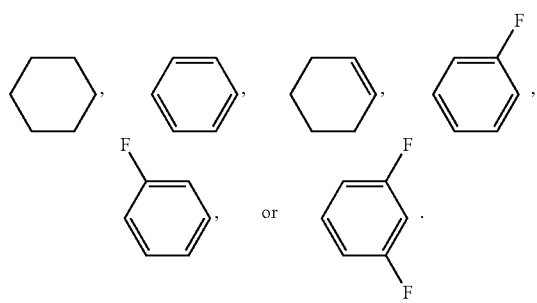

Optionally, the above-mentioned one or more compounds represented by formula VI are selected from the group consisting of compounds represented by formulas VI1 to VI7:

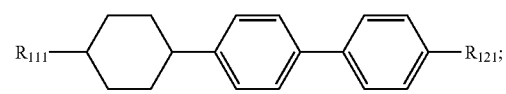

VI1

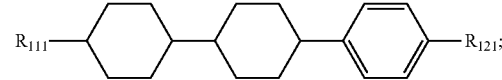

VI2

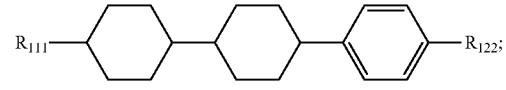

VI3

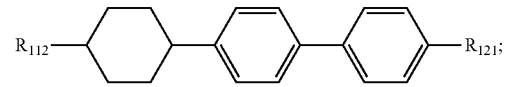

VI4

-continued

VI5

VI6 wherein $R_{121}$ represents an alkyl group having a carbon atom number of 1-6, $R_{122}$ represents an alkoxy having a carbon atom number of 1-6, $R_{111}$ represents an alkyl having a carbon atom number of 2-6, and $R_{112}$ represents an alkenyl group having a carbon atom number of 2-6.

Where the terminal chain of the above-mentioned compound represented by formula VI is alkenyl $R_{112}$, the liquid crystal compound has a higher clearing point and an elastic constant, especially splay elasticity constant $K_{33}$, which is advantageous for improving the parameter performance of the liquid crystal composition.

The content in mass percentage of the above-mentioned one or more compounds represented by formula VI is preferably 1-40%, further preferably 5-20%, of the total mass of the liquid crystal composition.

As another embodiment of the liquid crystal display device of the present invention, the above-mentioned liquid crystal compound may comprise one or more compounds represented by formula VII:

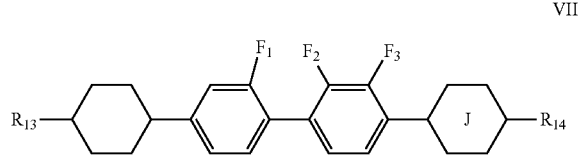

VII wherein $R_{13}$ and $R_{14}$ each independently represent an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or an fluoro-substituted alkenoxy group having a carbon atom number of 3-8;

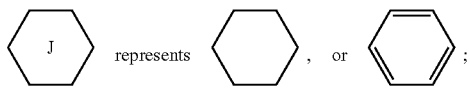

and $F_1$, $F_2$ and $F_3$ each independently represent H or F, with $F_2$ and $F_3$ not simultaneously being F.

Optionally, the above-mentioned one or more compounds represented by formula VII are preferably one or more selected from compounds represented by formulas VII1 to VII4:

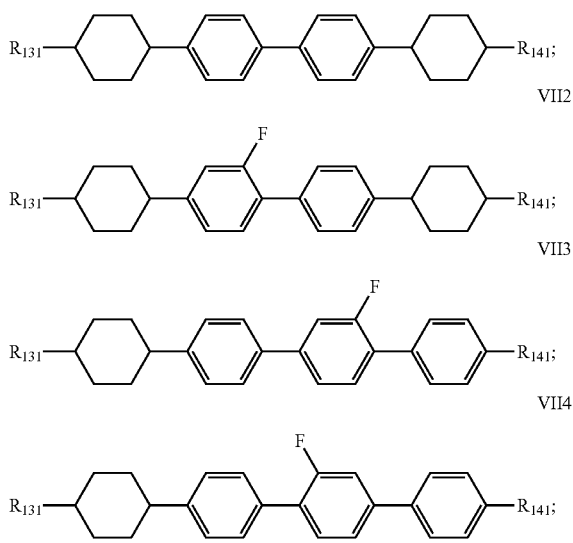

wherein $R_{131}$ and $R_{141}$ each independently represent an alkyl group having a carbon atoms number of 1-6.

The above-mentioned compounds represented by formulas VII1 to VII4 have a high clearing point, generally higher than 200° C., and can more significantly improve the clearing point of the liquid crystal composition.

The content in mass percentage of the above-mentioned one or more compounds represented by formula VII is preferably 1-10%, further preferably 2-5%, of the total mass of the liquid crystal composition.

EXAMPLES

In order to more clearly illustrate the present invention, the present invention will be further described below in conjunction with preferred examples. A person skilled in the art should understand that the following contents described in detail are illustrative rather than limiting, and should not limit the scope of protection of the present invention.

In the present invention, the preparation methods are all conventional methods unless otherwise specified, the raw materials used are all available from public commercial approaches unless otherwise specified, all percentages refer to mass percentages, the temperature is Celsius (° C.), liquid crystal compounds are also liquid crystal monomers, and the specific meanings and test conditions of the other symbols are as follows:

Cp represents the clearing point (° C.) of the liquid crystal measured by a DSC quantitative method;

$\Delta n$ represents the optical anisotropy, with $\Delta n = n_e - n_o$, in which $n_o$ is the refractive index of an ordinary light, and $n_e$ is the refractive index of an extraordinary light, with the test conditions being 25±2° C., 589 nm, and an abbe refractometer used for the test;

$\Delta \varepsilon$ represents the dielectric anisotropy, with $\Delta \varepsilon = \varepsilon_{//} - \varepsilon_{\perp}$, in which $\varepsilon_{//}$ is a dielectric constant parallel to a molecular axis, and $\varepsilon_{\perp}$ is a dielectric constant perpendicular to the molecular axis, with the test conditions being 25±0.5° C., a 20 micron parallel cell, and INSTEC: ALCT-IR1 for the test;

$\gamma 1$ represents a rotary viscosity (mPa·s), with the test conditions being 25±0.5° C., a 20 micron parallel cell, and INSTEC: ALCT-IR1 used for the test; and VHR represents voltage holding rate (%), with the test conditions being 20±2° C., a voltage of ±5 V, a pulse width of 10 ms, and a voltage holding time of 16.7 ms. The test equipment is a TOYO Model6254 liquid crystal performance comprehensive tester;

Afterimage evaluation: Afterimage evaluation on a liquid crystal display device involves displaying a specified fixed pattern in the display region for 1000 hours, and then evaluating the residual level of the fixed pattern under full-picture uniform display condition by means of visual inspection according to the following 4 levels.

⊚ There is no residue

○ There is a very small amount of residue, at an acceptable level

Δ There is residue, at an unacceptable level x There is residue, at a quite bad level The method for preparing the liquid crystal composition is as follows: various liquid crystal monomers are weighed at a certain ratio and then put into a stainless steel beaker, the stainless steel beaker containing these liquid crystal monomers is placed on a magnetic stirring apparatus and heated for melting, a magnetic rotor is added to the stainless steel beaker when most of the liquid crystal monomers in the stainless steel beaker are melted, the mixture is stirred uniformly and cooled to room temperature to obtain this liquid crystal composition.

In the examples of the present invention, liquid crystal monomer structures are represented by codes, wherein the code representation of cyclic structures, end groups and linking groups of the liquid crystals are shown in tables 1 and 2 below

TABLE 1

Corresponding code for ring structure

| Ring structure | Corresponding code |
|---|---|
| (cyclohexane) | C |
| (benzene) | P |
| (cyclohexene) | L |
| (fluorobenzene) | G |
| (difluorobenzene) | Y |

TABLE 2

Corresponding code for end group and linking group

| End group and linking group | Corresponding code |
| --- | --- |
| $C_nH_{2n+1}$— | n- |
| $C_nH_{2n+1}O$— | nO— |
| —$CF_3$ | —T |
| —$OCF_3$ | —OT |
| —$CH_2O$— | —O— |
| —F | —F |
| —CH=CH— | —V— |
| —CH=CH—$C_nH_{2n+1}$ | —Vn |
| 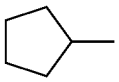 | Cp— |
|  | Cpr— |

EXAMPLES

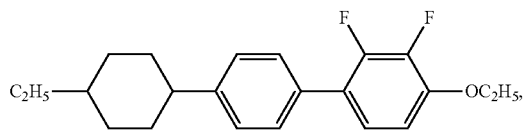

the code of which is CPY-2-O2; and

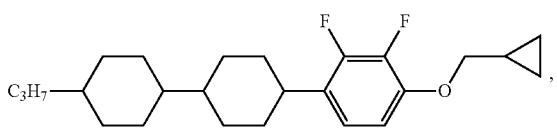

the code of which is CCY-3-OCpr.

Liquid Crystal Composition 1:
The formulation of liquid crystal composition 1 and the corresponding properties thereof are as shown in Table 3 below.

TABLE 3

Formulation of liquid crystal composition 1 and corresponding properties thereof

| Classification | Liquid crystal monomer code | Content (%) |
| --- | --- | --- |
| III | CC-2-3 | 10 |
| IV | COY-3-O2 | 10 |
| IV | COY-3-O1 | 10 |
| IV | CCOY-2-O2 | 9 |
| IV | CCY-3-O1 | 7 |
| IV | CCY-3-O2 | 6 |
| IV | CCY-4-O2 | 6 |
| IV | CPY-5-O2 | 8 |
| IV | CPY-3-OCpr | 10 |
| IV | CPY-2-O2 | 10 |
| IV | CY-3-O2 | 7 |
| IV | CY-3-O4 | 6.89 |
| I | I | 0.01 |
| II | II-1 | 0.1 |

Δε[1 KHz 20° C.]: −5.9
ε⊥[1 KHz, 20° C.]: 10.6
Δn[589 nm, 20° C.]: 0.105

TABLE 3-continued

Formulation of liquid crystal composition 1 and corresponding properties thereof Cp: 86° C.
γ₁: 203 mPa · s In liquid crystal composition 1, a compound represented by formula II-1 comprising two hydroxyl groups as anchoring functional groups and one methacrylate group as a polymerizable functional group is used as a self-aligning agent.

Liquid Crystal Composition 2:
The formulation of liquid crystal composition 2 and the corresponding properties thereof are as shown in Table 4 below.

TABLE 4

Formulation of liquid crystal composition 2 and corresponding properties thereof

| Classification | Liquid crystal monomer code | Content (%) |
| --- | --- | --- |
| III | CC-2-3 | 13.7 |
| III | CC-4-3 | 6 |
| IV | COY-Cp-O2 | 10 |
| IV | COY-3-O1 | 10 |
| IV | CCOY-2-O2 | 9 |
| IV | CCY-3-O2 | 7 |
| IV | CCY-4-O2 | 7 |
| IV | CPY-5-O2 | 10 |
| IV | CPY-3-O2 | 10 |
| IV | CPY-2-O2 | 10 |
| IV | CY-3-O2 | 6.7 |
| I | I | 0.1 |
| II | II-14 | 0.5 |

Δε[1 KHz 20° C.]: −5.3
ε⊥[1 KHz, 20° C.]: 49.6
Δn[589 nm, 20° C.]: 0.102
Cp: 86° C.
γ₁: 181 mPa · s

In liquid crystal composition 2, a compound represented by formula II-14 comprising two hydroxyl groups as anchoring functional groups and two methacrylate groups as polymerizable functional groups is used as a self-aligning agent.

Liquid Crystal Composition 3:
The formulation of liquid crystal composition 3 and the corresponding properties thereof are as shown in Table 5 below.

TABLE 5

Formulation of liquid crystal composition 3 and corresponding properties thereof

| Classification | Liquid crystal monomer code | Content (%) |
| --- | --- | --- |
| III | CC-2-3 | 21 |
| III | CC-4-3 | 6.5 |
| III | PP-5-1 | 10.5 |
| IV | COY-3-O2 | 8 |
| IV | COY-3-O1 | 7 |
| IV | CCOY-2-O2 | 9 |
| IV | CPY-5-O2 | 3 |
| IV | CPY-3-O2 | 10 |
| IV | CPY-2-O2 | 10 |
| VI | CPP-3-2 | 7 |
| VI | CPP-5-2 | 6.97 |

TABLE 5-continued

Formulation of liquid crystal composition 3
and corresponding properties thereof

| | | |
|---|---|---|
| I | I | 0.03 |
| II | II-20 | 1 |

Δε[1 KHz 20° C.]: −3.3
ε⊥[1 KHz, 20° C.]: 6.8
Δn[589 nm, 20° C.]: 0.109
Cp: 74° C.
$γ_1$: 92 mPa · s

In liquid crystal composition 3, a compound represented by formula II-23 comprising three hydroxyl groups as anchoring functional groups and two methacrylate groups as polymerizable functional groups is used as a self-aligning agent.

Liquid Crystal Composition 4:

The formulation of liquid crystal composition 4 and the corresponding properties thereof are as shown in Table 6 below.

TABLE 6

Formulation of liquid crystal composition 4
and corresponding properties thereof

| Classification | Liquid crystal monomer code | Content (%) |
|---|---|---|
| III | CC-2-3 | 10 |
| III | CC-3-V | 10 |
| III | PP-5-O2 | 5 |
| IV | COY-3-O2 | 8 |
| IV | COY-3-O1 | 7 |
| IV | CCOY-2-O2 | 12 |
| IV | CPY-Cp-O2 | 7 |
| IV | CPY-3-O2 | 10 |
| IV | CPY-2-O2 | 10 |
| IV | PY-3-O2 | 9.5 |
| VI | CCP-3-1 | 2 |
| VI | CCP-V-1 | 4 |
| VI | CCP-V2-1 | 3.7 |
| I | I | 0.3 |
| II | II-27 | 1.5 |

Δε[1 KHz 20° C.]: −4.3
ε⊥[1 KHz, 20° C.]: 8.7
Δn[589 nm, 20° C.]: 0.112
Cp: 79° C.
$γ_1$: 120 mPa · s

In liquid crystal composition 4, a compound represented by formula II-27 comprising two hydroxyl groups as anchoring functional groups and two methacrylate groups as polymerizable functional groups is used as a self-aligning agent.

Liquid Crystal Composition 5:

The formulation of liquid crystal composition 5 and the corresponding properties thereof are as shown in Table 7 below.

TABLE 7

Formulation of liquid crystal composition 5
and corresponding properties thereof

| Classification | Liquid crystal monomer code | Content (%) |
|---|---|---|
| III | CC-2-3 | 22 |
| III | CC-4-3 | 6.5 |
| III | PP-5-1 | 1.5 |
| IV | COY-3-O2 | 8 |
| IV | COY-3-O1 | 7 |
| IV | CCOY-2-O2 | 9 |
| IV | CPY-5-O2 | 3 |
| IV | CPY-3-O2 | 10 |
| IV | CPY-2-O2 | 10 |
| IV | CCY-3-O2 | 4 |
| IV | CCY-5-O2 | 4 |
| IV | CY-3-O4 | 5 |
| IV | CY-3-O2 | 5 |
| VII | CPPC-3-3 | 1.5 |
| VII | CGPC-3-3 | 1 |
| I | I | 0.5 |
| II | II-30 | 2 |

Δε[1 KHz 20° C.]: −4.3
ε⊥[1 KHz, 20° C.]: 8.1
Δn[589 nm, 20° C.]: 0.091
Cp: 74° C.
$γ_1$: 107 mPa · s

In liquid crystal composition 5, a compound represented by formula II-30 comprising two hydroxyl groups as anchoring functional groups and two methacrylate groups as polymerizable functional groups is used as a self-aligning agent.

Liquid Crystal Composition 6:

The formulation of liquid crystal composition 6 and the corresponding properties thereof are as shown in Table 8 below.

TABLE 8

Formulation of liquid crystal composition 6
and corresponding properties thereof

| Classification | Liquid crystal monomer code | Content (%) |
|---|---|---|
| III | CC-2-3 | 22 |
| III | CC-4-3 | 6.5 |
| III | PP-5-1 | 10.5 |
| III | CC-3-V | 21 |
| IV | COY-3-O2 | 4 |
| IV | COY-3-O1 | 3 |
| IV | CCOY-2-O2 | 5 |
| IV | CPY-5-O2 | 3 |
| IV | CPY-3-O2 | 8.2 |
| VI | CCP-3-1 | 5 |
| VI | CPP-3-2V1 | 4 |
| VI | CPP-1V-2 | 4 |
| VII | CGPC-3-3 | 2 |
| I | I | 0.8 |
| II | II-37 | 1 |

Δε[1 KHz 20° C.]: −1.7
ε⊥[1 KHz, 20° C.]: 4.4
Δn[589 nm, 20° C.]: 0.090
Cp: 67° C.
$γ_1$: 52 mPa · s

In liquid crystal composition 6, a compound represented by formula II-37 comprising two hydroxyl groups as anchoring functional groups and three methacrylate groups as polymerizable functional groups is used as a self-aligning agent.

Liquid Crystal Composition 7:

The formulation of liquid crystal composition 7 and the corresponding properties thereof are as shown in Table 9 below.

TABLE 9

Formulation of liquid crystal composition 7 and corresponding properties thereof

| Classification | Liquid crystal monomer code | Content (%) |
|---|---|---|
| III | CC-2-3 | 22 |
| III | CC-4-3 | 6.5 |
| III | PP-5-1 | 10.5 |
| III | CC-3-V | 19 |
| IV | COY-3-O2 | 4 |
| IV | COY-3-O1 | 3 |
| IV | CCOY-2-O2 | 5 |
| IV | CPY-5-O2 | 3 |
| IV | CPY-3-O2 | 8 |
| VI | CCP-3-1 | 5 |
| VI | CPP-3-2V1 | 4 |
| VI | CPP-1V-2 | 4 |
| VII | CGPC-3-3 | 2 |
| I | I | 1 |
| II | II-40 | 3 |

$\Delta\epsilon$[1 KHz 20° C.]: −1.5
$\epsilon_\perp$[1 KHz, 20° C.]: 4.2
$\Delta n$[589 nm, 20° C.]: 0.088
Cp: 68° C.
$\gamma_1$: 49 mPa·s In liquid crystal composition 7, a compound represented by formula II-40 comprising two hydroxyl groups as anchoring functional groups and three methacrylate groups as polymerizable functional groups is used as a self-aligning agent.

Example 1

A thin film transistor substrate is prepared as a first substrate, and a colour filter substrate is prepared as a second substrate, with the surface of said first substrate in contact with the liquid crystal composition being provided with an alignment layer while said second substrate has no alignment layer; a liquid crystal composition 1 is poured between the first substrate and the second substrate and is sealed; and then, liquid crystal composition 1 is irradiated by means of ultraviolet light from the first substrate side or the second substrate side in order to allow the self-aligning agent to polymerize with a polymerizable compound in the liquid crystal composition. The ultraviolet radiation intensity is 64 mW/cm², the wavelength is 365 nm, and the irradiation time is 200 s. Thus, a liquid crystal display device is obtained as Example 1.

Examples 2-7

Liquid crystal composition 1 in Example 1 is respectively replaced with liquid crystal compositions 2-7 while the other conditions are the same as in Example 1 to respectively obtain liquid crystal display devices as Examples 2-7.

Comparative Example 1

The polymerizable compound represented by formula I in liquid crystal composition 3 of Example 3 is replaced with a polymerizable compound represented by formula I-1 to obtain a comparative liquid crystal composition 1 as the liquid crystal composition, and the remaining part of the process is the same as that of Example 3 to manufacture a liquid crystal display device as Comparative Example 1.

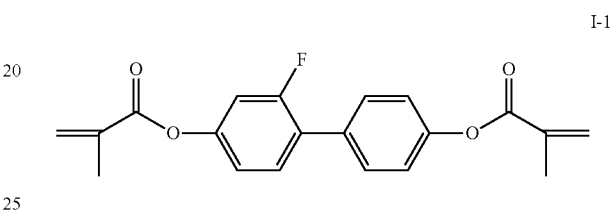

I-1

Comparative Example 2

A thin film transistor substrate without any alignment layer provided on the surface in Example 3 is used as a first substrate, a colour filter substrate without any alignment layer provided on the surface is used as a second substrate, and the remaining part of the process is the same as that of Example 3 to manufacture a liquid crystal display device as Comparative Example 2.

The liquid crystal display devices which have undergone ultraviolet irradiation are subjected to calculation for the conversion ratio of the reactive mesogen (RM), voltage holding ratio (VHR) testing, and afterimage evaluation. The formula for calculating the conversion ratio of a reactive mesogen (RM) is:

$$\text{Conversion ratio} = \frac{\text{Initial value} - \text{Residue value}}{\text{Initial value}}$$

The following table relates to the measurement data of the performance evaluation on the liquid crystal display devices of Examples 1-7 and Comparative Examples 1 and 2.

TABLE 10

Measurement data of performance evaluation on liquid crystal display devices

| | Example 1 | Example 2 | Example 3 | Example 4 | Example 5 | Example 6 | Example 7 | Comparative Example 1 | Comparative Example 2 |
|---|---|---|---|---|---|---|---|---|---|
| VHR | 99.1 | 99.1 | 99.0 | 99.0 | 98.9 | 99.2 | 99.2 | 98.5 | 98.4 |
| Conversion ratio of RM | 30% | 30% | 33% | 35% | 30% | 31% | 31% | 25% | 30% |
| Afterimage evaluation | ○ | Δ | ○ | Δ | Δ | ○ | ○ | × | × |

It can be obviously seen from Table 10 mentioned above that compared with the liquid crystal display devices provided by Comparative Examples 1 and 2, the liquid crystal display devices provided by Examples 1-7 of the present invention have a higher VHR, a higher conversion ratio of RM and a better afterimage level.

By comparing Example 3 with Comparative Example 1, the polymerizable compound represented by formula I, with respect to the polymerizable compound represented by formula I-1, as the reactive mesogen (RM) has a faster conversion of RM, a higher conversion ratio and less residue during the same UV-involved manufacturing process, so that by using the polymerizable compound represented by formula I as the reactive mesogen (RM), the process of preparing the liquid crystal display device can be effectively shortened, the production efficiency can be improved, and the extent of the afterimage display defect that occurs to the liquid crystal display device can be reduced.

By comparison between Example 3 and Comparative Example 2, although the use of the liquid crystal display device without any alignment layer in Comparative Example 2 can shorten the process of preparing the liquid crystal display device and improve the production efficiency, impurities such as ions in the surface of the substrate are more liable to enter the liquid crystal composition, due to the lack of an alignment layer, so that the VHR of the liquid crystal display device is reduced, thereby causing the afterimage situation of the liquid crystal display device to become more serious. Moreover, due to the lack of the alignment function of an alignment layer, the liquid crystal molecules are more prone to the problem of poor alignment, resulting in the occurrence of the problem of non-uniform display to the liquid crystal display device.

The invention claimed is:

1. A liquid crystal display device, wherein said liquid crystal display device comprises:
   a first substrate,
   a second substrate, and
   a liquid crystal composition disposed between said first substrate and said second substrate,
   wherein a surface of said first substrate in contact with said liquid crystal composition is provided with an alignment layer, said second substrate has no alignment layer; and
   said liquid crystal composition comprises a liquid crystal compound, a self-aligning agent, and a polymerizable compound,
   wherein the polymerizable compound is a compound represented by Formula I, the self-aligning agent is a compound represented by formula II30, the liquid crystal compound comprises one or more compounds represented by formulas III2, III11, III13, and one or more compounds represented by formulas IV1, IV3 to IV6:

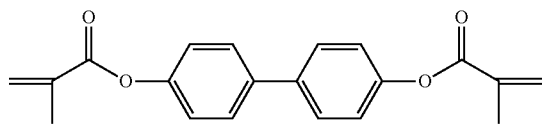

I

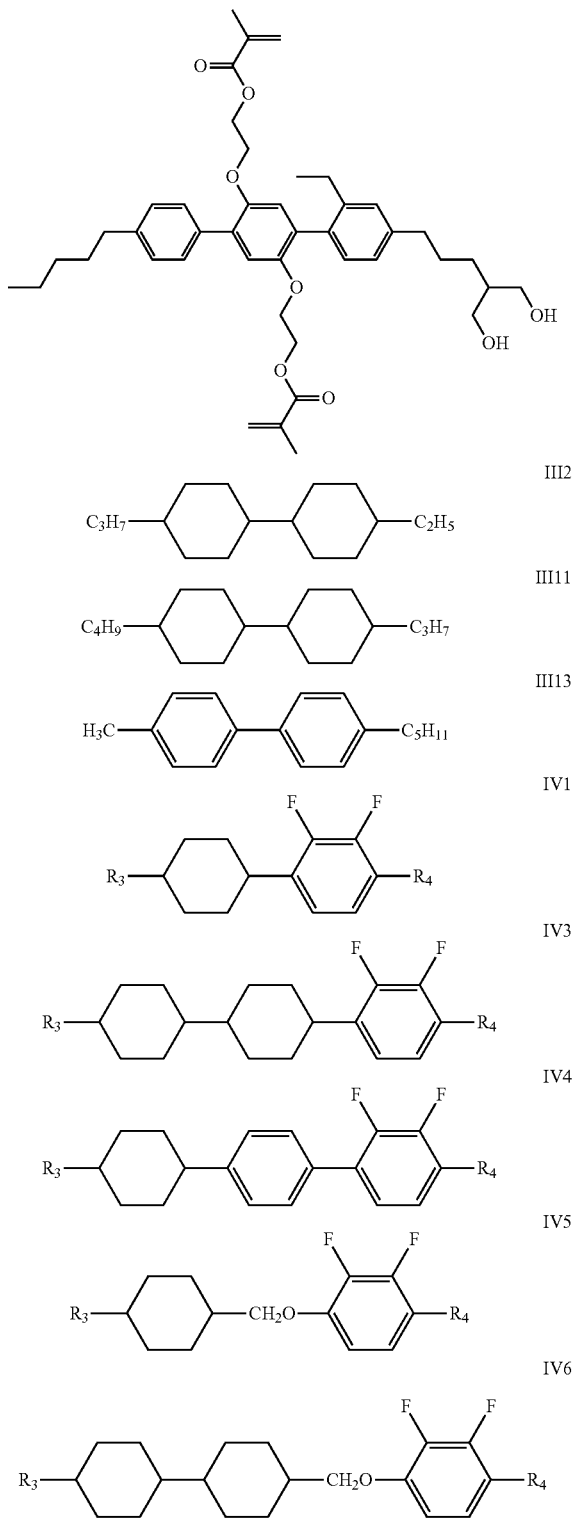

wherein $R_3$ and $R_4$ each independently represent an alkyl group having a carbon atom number of 1-10, or an alkoxy group having a carbon atom number of 1-10; and a content in percentage of the compound represented by Formula I is 0.03-0.5%, a content in percentage of the compound represented by formula II30 is 0.5-3%, a content in percentage of the compound represented by formulas III2, III11, III13 is 10-40%, and a content in percentage of the compound represented by formulas IV1, IV3 to IV6 is 40-65%, of a total mass of the liquid crystal composition.

2. The liquid crystal display device according to claim 1, wherein said first substrate is a thin film transistor substrate, and said second substrate is a colour filter substrate; or said first substrate is a colour filter substrate, and said second substrate is a thin film transistor substrate.

3. The liquid crystal display device according to claim 1, wherein said alignment layer has a thickness of 30 nm to 120 nm; and said alignment layer is a polyimide film layer.

4. The liquid crystal display device according to claim 1, wherein said liquid crystal compound further comprises one or more compounds represented by formula VI:

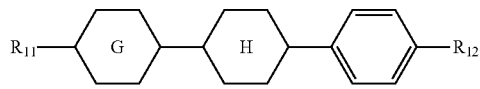
VI wherein $R_{11}$ and $R_{12}$ each independently represent an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, wherein any one or more non-connected —$CH_2$— in the groups represented by $R_{11}$ and $R_{12}$ are each independently optionally substituted with cyclopentylidene, cyclobutylidene or cyclopropylidene; and

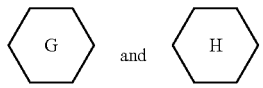

and each independently represent

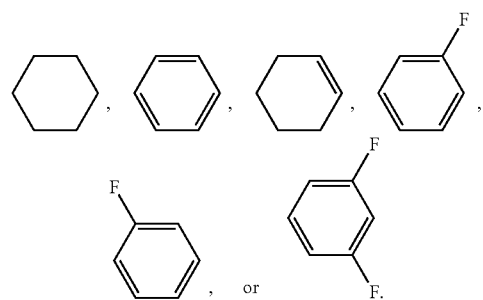

5. The liquid crystal display device according to claim 1, wherein said liquid crystal compound further comprises one or more compounds represented by formula VII:

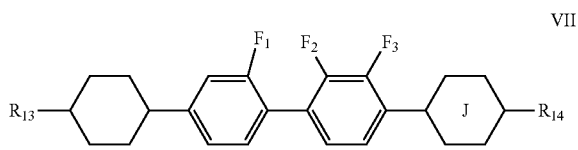
VII wherein $R_{13}$ and $R_{14}$ each independently represent an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or an fluoro-substituted alkenoxy group having a carbon atom number of 3-8;

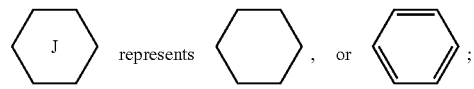

and
$F_1$, $F_2$ and $F_3$ each independently represent H or F, with $F_2$ and $F_3$ not simultaneously being F.

* * * * *